(12) United States Patent
Uemura et al.

(10) Patent No.: US 6,624,877 B2
(45) Date of Patent: Sep. 23, 2003

(54) METHOD OF AND APPARATUS FOR RECORDING IMAGE BY EXPOSURE TO LIGHT BEAMS

(75) Inventors: Takayuki Uemura, Odawara (JP); Ichirou Miyagawa, Minamiashigara (JP); Takao Ozaki, Odawara (JP); Atsushi Suganuma, Minamiashigara (JP); Teruji Ikematsu, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/879,148

(22) Filed: Jun. 13, 2001

(65) Prior Publication Data

US 2001/0050760 A1 Dec. 13, 2001

(30) Foreign Application Priority Data

Dec. 19, 2000 (JP) .......................... 2000-385073
Jun. 13, 2000 (JP) .......................... 2000-177412

(51) Int. Cl.$^7$ ........................... G03B 27/58; G03B 27/52
(52) U.S. Cl. .............................. 355/47; 355/40; 355/41
(58) Field of Search ........................ 355/40, 41, 47, 355/54, 55, 67, 77; 347/241–243

(56) References Cited

U.S. PATENT DOCUMENTS

| 5,453,777 A | | 9/1995 | Pensavecchia et al. ..... 347/234 |
| 5,982,402 A | * | 11/1999 | Yoshikawa et al. ......... 347/116 |
| 6,141,030 A | * | 10/2000 | Fujita et al. ................ 347/233 |
| 6,188,466 B1 | * | 2/2001 | Iwasa et al. .................. 355/70 |
| 6,249,306 B1 | * | 6/2001 | Isono et al. ................. 347/233 |

FOREIGN PATENT DOCUMENTS

JP 7-23195 1/1995

* cited by examiner

Primary Examiner—Henry Hung Nguyen
(74) Attorney, Agent, or Firm—Sughrue Mion, PLLC

(57) ABSTRACT

For dividing an image and recording divided images on a photosensitive film with a plurality of laser beams, an auxiliary scanning speed is reduced in the vicinity of junctions between adjacent ones of the divided images to adjust the intervals between main scanning lines, and each of the main scanning lines is divided into divided main scanning lines in a main scanning direction, and the divided main scanning lines are formed separately in an auxiliary scanning direction. With such a correcting process, a high-quality image free of striped artifacts and inclination differences of main scanning lines can be recorded on the photosensitive film.

9 Claims, 14 Drawing Sheets

METHOD OF AND APPARATUS FOR RECORDING IMAGE BY EXPOSURE TO LIGHT BEAMS

BACKGROUND OF THE INVENTION

1. Field of the Invention

The present invention relates to a method of and an apparatus for recording a two-dimensional image on a photosensitive medium by exposure to light beams which are emitted from a plurality of light sources arrayed in an auxiliary scanning direction and applied to scan the photosensitive medium in a main scanning direction and the auxiliary scanning direction.

2. Description of the Related Art

There have been used exposure recording apparatus in which a drum with a photosensitive medium mounted on its outer circumferential surface is rotated about its own axis in a main scanning direction and the photosensitive medium is scanned with a laser beam that has been modulated by an image to be recorded, in an auxiliary scanning direction perpendicular to the main scanning direction, for thereby recording a two-dimensional image on the photosensitive medium.

One type of such exposure recording apparatus has a plurality of light sources arrayed in the auxiliary scanning direction which can simultaneously be energized to record a large-size image at a high speed (see Japanese laid-open patent publication No. 7-23195). If the positions of images produced by adjacent ones of the light sources are inaccurate relatively to each other, then junctions between recording ranges of the light sources suffer from striped image irregularities or artifact.

According to the above conventional exposure recording apparatus, if the positions of images produced by the light sources are misaligned in the main scanning direction, then such a positional misalignment is corrected by delaying or advancing the recording times of the light sources in the main scanning direction by a certain relative period. If the positions of images produced by the light sources are misaligned in the auxiliary scanning direction, then times to start or complete recording images in the auxiliary scanning direction by the respective light sources are shifted by the number of pixels that is obtained by rounding off the image position misalignment, for thereby correcting a misalignment that is equal to or greater than one half of a pixel, and the speed of movement of the light sources in the auxiliary scanning direction is partially adjusted to form an overlap between pixels, for thereby correcting a misalignment that is less than one half of a pixel.

In the above conventional exposure recording apparatus, since pixels represented by the same image information overlap each other in correcting a misalignment that is less than one half of a pixel, an image irregularity due to the pixel overlap is visually recognized. Consequently, the correcting process according to the conventional exposure recording apparatus is too rough and should not be applied to a process of forming highly accurate images such as on printed materials for commercial use.

SUMMARY OF THE INVENTION

It is a general object of the present invention to provide a method of and an apparatus for recording a high-quality image at a high speed.

A major object of the present invention is to provide a method of and an apparatus for recording an image by exposure to light beams which are emitted from a plurality of simultaneously energized light sources arrayed in an auxiliary scanning direction, without producing striped image irregularities or artifact between images recorded by the respective light sources.

Another object of the present invention is to provide a method of and an apparatus for recording an image by joining images well in an auxiliary scanning direction with an inexpensive arrangement without the need for mechanical or optical adjustments.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
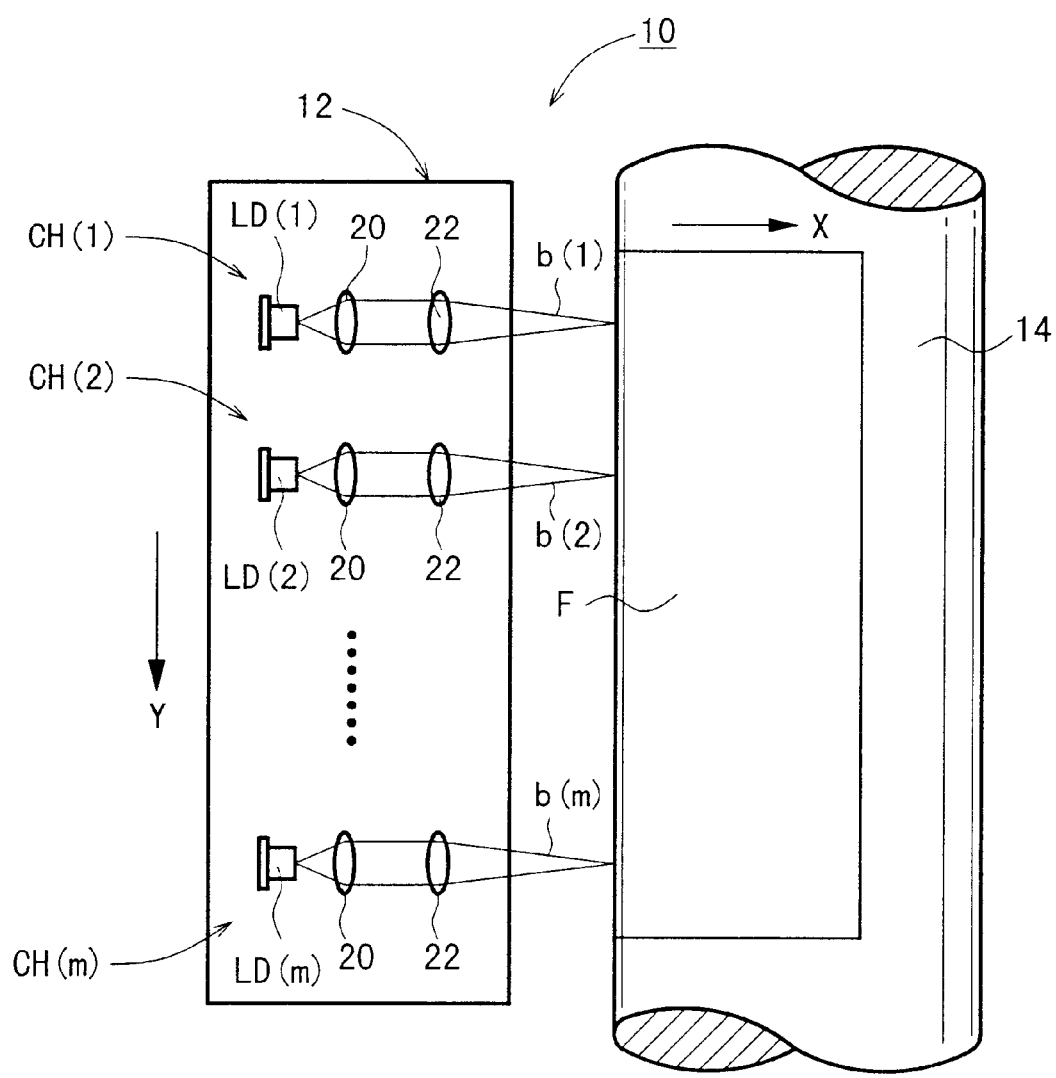
FIG. 1 is a plan view of a laser beam recording apparatus as an exposure recording apparatus according to an embodiment of the present invention.
Figure 2:
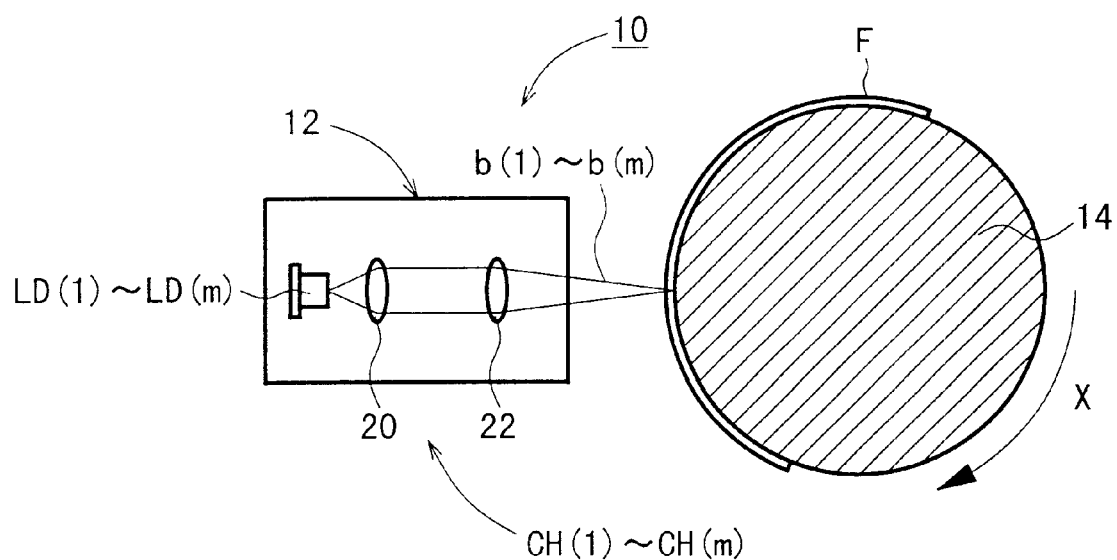
FIG. 2 is a side elevational view of the laser beam recording apparatus shown in FIG. 1.

FIGS. 1 and 2 show a laser beam recording apparatus 10 which incorporates a method of and an apparatus for recording an image by exposure to light beams, i.e., an exposure recording method and an exposure recording apparatus, according to the present invention.

As shown in FIGS. 1 and 2, the laser beam recording apparatus 10 records an area-modulated image on a recording film F mounted on a drum 14 by applying a plurality of laser beams b(1) through b(m) emitted from an exposure head 12 to the recording film F. The area-modulated image is recorded as a two-dimensional image on the recording film F when the drum 14 rotates about its own axis in a main scanning direction indicated by the arrow X (hereinafter referred to as "main scanning direction X") and the exposure head 12 moves relatively to the drum 14 in an auxiliary scanning direction indicated by the arrow Y (hereinafter referred to as "auxiliary scanning direction Y") which is substantially perpendicular to the main scanning direction. The area-modulated image is an image made up of a plurality of pixels that are produced on the recording film F by selectively turning on and off the laser beams b(1) through b(m) depending on the image information to be recorded. The pixels take up an area on the recording film F which is commensurate with a desired gradation.

The exposure head 12 comprises a plurality of light source units CH(1)–CH(m) arrayed in the auxiliary scanning direction Y. The light source units CH(1) through CH(m) comprise respective laser diodes LD(1) through LD(m) for emitting the respective laser beams b(1) through b(m) modulated with the image information, respective collimator lenses 20 for collimating the respective laser beams b(1)–b(m), and respective focusing lenses 22 for focusing the collimated laser beams b(1) through b(m), respectively, onto the recording film F.

Figure 3:
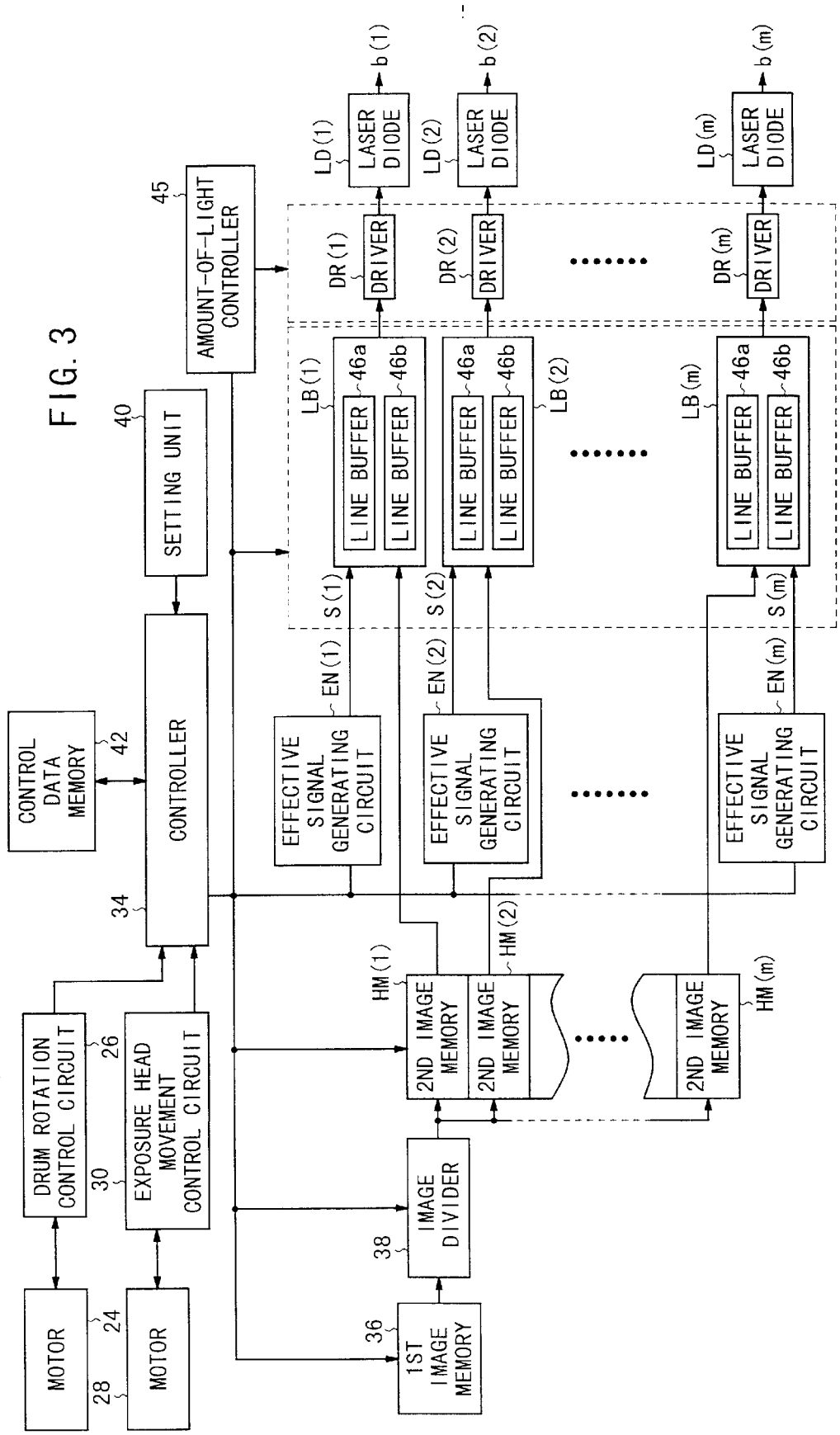
FIG. 3 is a block diagram of a control circuit of the laser beam recording apparatus.

FIG. 3 shows in block form a control circuit of the laser beam recording apparatus 10. As shown in FIG. 3, the control circuit comprises a drum rotation control circuit 26 for controlling a drum rotation motor 24 to rotate the drum 14 and generating main and auxiliary scanning signals based on the angular displacement of the drum 14, an exposure head movement control circuit (auxiliary scanning controller) 30 for controlling an exposure head movement motor 28 to move the exposure head 12 in the auxiliary scanning direction Y, and a controller 34 for controlling operation of the laser beam recording apparatus 10. The main scanning signals are timing signals for setting the timing to record pixels with the laser beams b(1) through b(m), and the auxiliary scanning signals are timing signals for setting the timing to record main scanning lines.

To the controller 34, there are connected a first image memory 36 for storing two-dimensional image data to be recorded on the recording film F, an image divider 38 for dividing two-dimensional image data into two-dimensional image data depending on intervals between the light source units CH(1) through CH(m) in the auxiliary scanning direction Y, a plurality of second image memories (image storage means) HM(1) through HM(m) for storing divided two-dimensional image data in association with the respective light source units CH(1) through CH(m), a plurality of effective signal generating circuits (effective signal generating means) EN(1) through EN(m) for generating effective signals based on the auxiliary scanning signals, and a plurality of buffer memories LB(1) through LB(m) for temporarily storing image data for respective main scanning lines which are supplied from the second image memories HM(1) through HM(m).

Each of the buffer memories LB(1) through LB(m) comprises two line buffers 46a, 46b. The buffer memories LB(1) through LB(m) are connected respectively to drivers (light source driving means) DR(1) through DR(m) whose drive currents are controlled by an amount-of-light controller 45 that is connected to the controller 34. The buffer memories LB(1) through LB(m) supply stored image data to the drivers DR(1) through DR(m) while the buffer memories LB(1) through LB(m) are being supplied with effective signals from the corresponding effective signal generating circuits EN(1) through EN(m). Based on the image data supplied from the buffer memories LB(1) through LB(m), the drivers DR(1) through DR(m) supply drive currents to the respective laser diodes LD(1) through LD(m) to record a desired image on the recording film F.

To the controller 34, there are also connected a setting unit 40 for setting various data for correcting positional misalignments of the laser beams b(1) through b(m) which are caused by manufacturing errors, etc. of the exposure head 12, and a control data memory 42 for storing control data including various data that have been set by the setting unit 40.

The laser beam recording apparatus 10 is basically constructed as described above. Exposure recording methods carried out by the laser beam recording apparatus 10 will be described below. It is assumed in the following description that the reference character "i" represents "1" through "m" and the reference character "j" represents "1" through "m−1".

Figure 4:
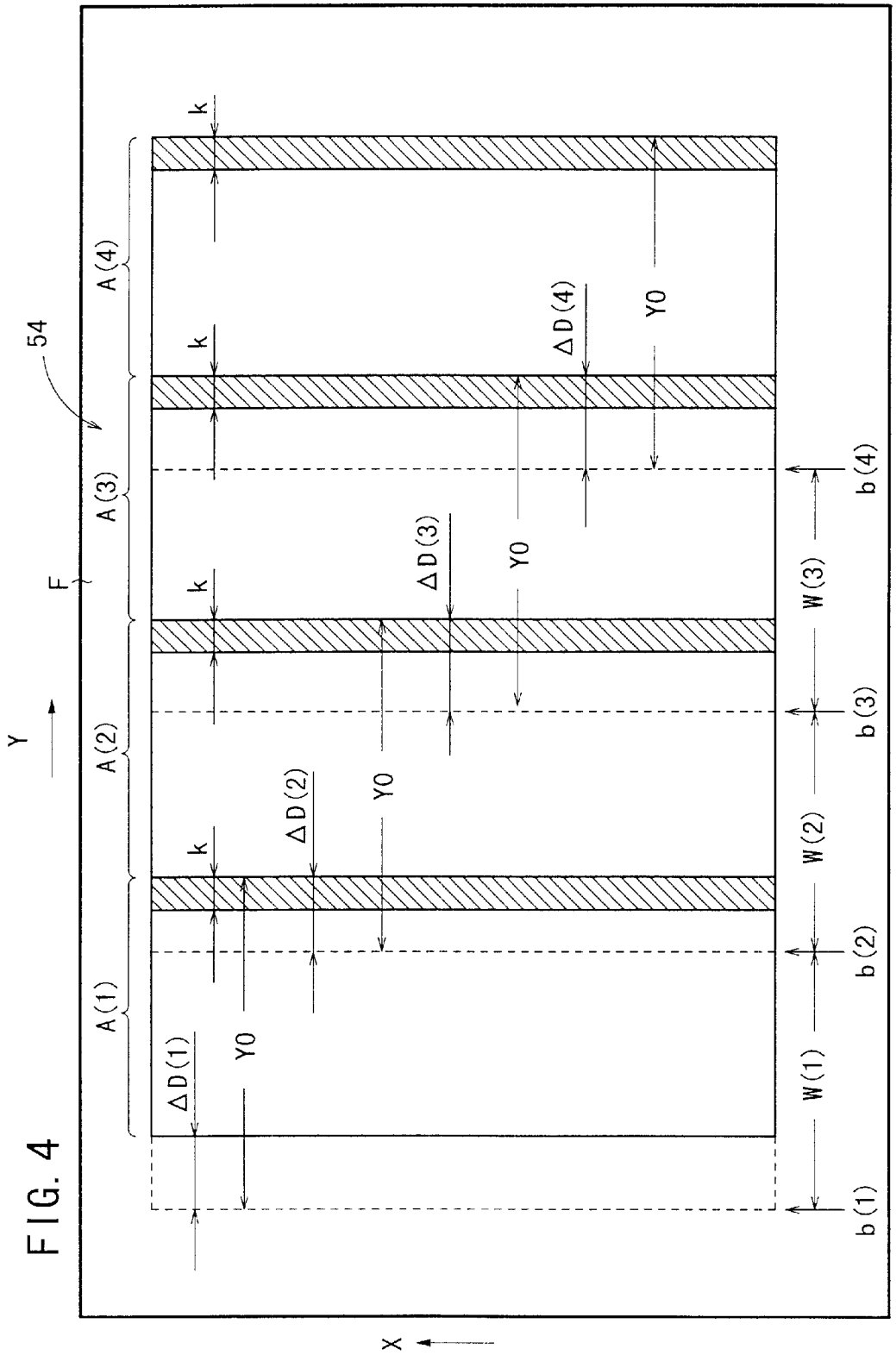
FIG. 4 is a view of an image which is produced by an exposure recording method according to an embodiment of the present invention.

In the laser beam recording apparatus 10, the laser beams b(1) through b(m) produce respective m ($\geq 2$) images A(i) that are divided in the auxiliary scanning direction. The produced images A(i) are joined together into a large-size image. FIG. 4 shows, by way of example, an image 54 to be recorded on the recording film F by exposure to laser beams, the image 54 being divided into four images A(1)–A(4) in the auxiliary scanning direction Y. The divided images A(1) through A(4) are recorded on the recording film F by the laser beams b(1)–b(4) emitted from the four light source units CH(1) through CH(4), and simultaneously complete being recorded on the recording film F.

First, beam intervals W(j) in the auxiliary scanning direction Y on the recording film F between the laser beams b(i) emitted from the laser diodes LD(i) are determined. For example, the beam intervals W(j) can be determined by generating main scanning lines on the recording film F with the laser beams b(i) and measuring the distances between the generated main scanning lines. The data of the determined beam intervals W(j) are stored in the control data memory 42.

The interval in the auxiliary scanning direction Y between adjacent two of pixels that are produced on the recording film F by the laser beams b(i) is referred to as a pixel pitch P. A converted line number Y(j), which represents the number of main scanning lines converted from a beam interval W(j), is determined as:

$$Y(j)=W(j)/P \qquad (1)$$

The pixel pitch P is of a value obtained when the exposure head 12 is moved at a given auxiliary scanning speed V in the auxiliary scanning direction Y.

If the beam interval W(j) is not set to an accurate value, then when the divided images A(i) simultaneously start being recorded and simultaneously complete being recorded by the respective laser beams b(i), the intervals between adjacent pixels at the junctions between the divided images A(i) are not equal to the pixel pitch P, tending to cause striped image irregularities or artifact extending in the main scanning direction X.

In order to avoid the above artifact, the number of main scanning lines that make up the divided images A(i) produced by the respective laser beams b(i) and the pixel intervals at the junctions between the divided images A(i) are corrected as follows:

It is assumed that the numbers of main scanning lines that make up divided images A(i) at a pixel pitch P are represented by L(i) (integer) and the total number of main scanning lines that make up the image 54 is represented by La. The total number La of main scanning lines is expressed by:

$$La = L(1) + \ldots + L(m) \quad (2)$$

The light source units CH(i) of the exposure head 12 are fed the same feed distance in the auxiliary scanning direction Y, and a converted line number, which represents the number of main scanning lines converted from the feed distance of the light source units CH(i), is represented by Y0.

If a corrective converted line number representing the number of main scanning lines to be corrected for each of the light source units CH(i) is represented by $\Delta D(i) + \Delta S(i)$, then the number L(i) of main scanning lines that make up each of the divided images A(i) is expressed by:

$$L(i) = Y0 - (\Delta D(i) + \Delta S(i)) \quad (3)$$

where $\Delta D(i)$ represents integral part of the corrective converted line number and $\Delta S(i)$ represents decimal part of the corrective converted line number.

The corrective converted line number $(\Delta D(i) + \Delta S(i))$ can be determined as:

$$\Delta D(i) + \Delta S(i) = (L(i-1) + \Delta D(i-1) + \Delta S(i-1)) - Y(i-1) = Y0 - Y(i-1) \quad (4)$$

It is assumed that the corrective converted line number $(\Delta D(1) + \Delta S(1))$ can be set to any desired value depending on the position where the recording film F starts being exposed to the laser beam b(1). The integral part $\Delta D(i)$ and decimal part $\Delta S(i)$ of the corrective converted line number are stored in the control data memory 42.

Figure 5:
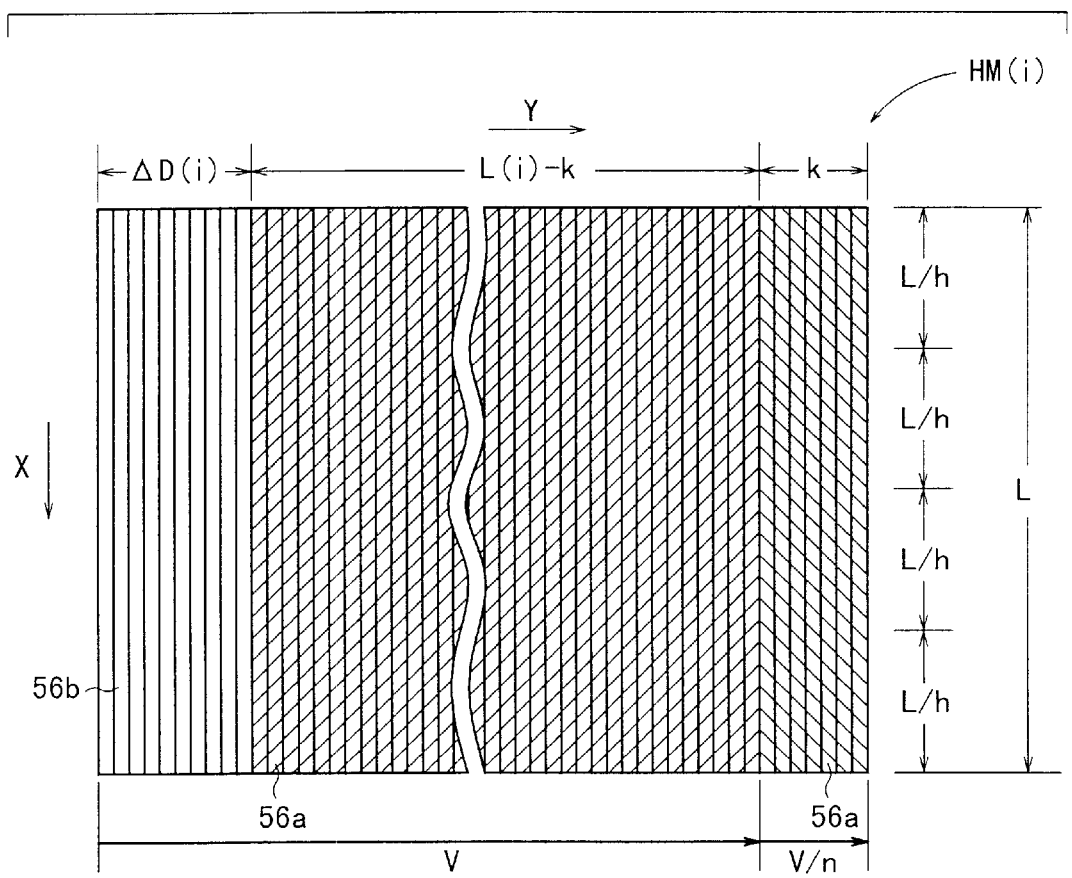
FIG. 5 is a diagram showing a second image memory for storing ineffective images and effective images in the exposure recording method.

Then, the image divider 38 divides the two-dimensional image data supplied from the first image memory 36 into m two-dimensional image data based on the numbers L(i) of main scanning lines read determined according to the equations (3) and (4). The divided m two-dimensional image data are stored in the second image memories HM(i), respectively. As shown in FIG. 5, each of the second image memories HM(i) has a storage area which stores effective image data 56a that corresponds to the divided image A(i) made up of the number L(i) of main scanning lines, from an address that is shifted from the start address of the memory by the integral part $\Delta D(i)$ of the corrective converted line number. Each of the second image memories HM(i) has another storage area that corresponds to the integral part D(i) of the corrective converted line number, the storage area storing any desired image data which will hereinafter be referred to as ineffective image data 56b.

Figure 6:
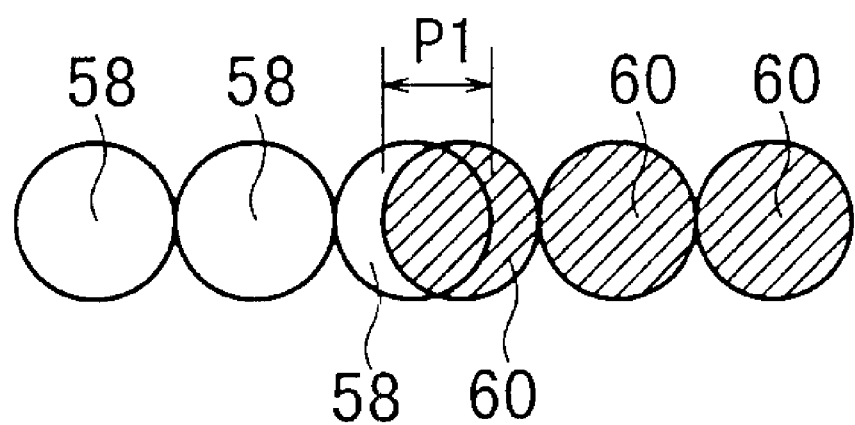
FIG. 6 is a diagram showing the positional relationship between pixels in the presence of a misalignment which is equal to or greater than one half of a pixel.
Figure 7:
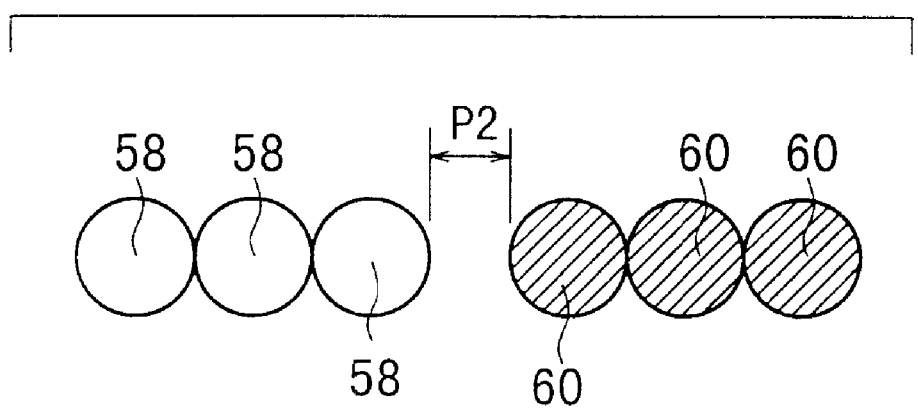
FIG. 7 is a diagram showing the positional relationship between pixels in the presence of a misalignment which is equal to or greater than one half of a pixel.

If an allowable pixel displacement between divided images A(i), A(i+1) is represented by $\Delta\alpha$, then when the allowable pixel displacement $\Delta\alpha$ is in the range $\Delta\alpha \geq P/2$ with respect to the pixel pitch P, the following process is carried out: As shown in FIG. 6, when pixels 58, 60 of the respective divided images A(i), A(i+1) overlap each other by P/2 or more (=P1), the number L(i+1) of main scanning lines that make up the divided image A(i+1) is decremented by 1, and the integral part $\Delta D(i+1)$ of the corrective converted line number that makes up the ineffective image data 56b is incremented by 1. As shown in FIG. 7, when pixels 58, 60 of the respective divided images A(i), A(i+1) spaced from each other by P/2 or more (=P2), the number L(i+1) of main scanning lines that make up the divided image A(i+1) is incremented by 1, and the integral part $\Delta D(i+1)$ of the corrective converted line number that makes up the ineffective image data 56b is decremented by 1. If $\Delta\alpha \geq P/2$, therefore, the displacement of the position recorded by the laser beam b(i) can be corrected only by adjusting the integral part $\Delta D(i)$ of the corrective converted line number.

An image recording process for $\Delta\alpha \geq P/2$ will be described below with reference to FIGS. 3 and 8.

The divided image data (the ineffective image data 56b and the effective image data 56a), corresponding to the main scanning lines $(\Delta D(i) + L(i))$, which are divided according to the equations (3) and (4) and stored in the second image memories HM(i), are read for each main scanning line and transferred as one-dimensional image data to the buffer memories LB(i). Each of the buffer memories LB(i) has the two line buffers 46a, 46b. The one-dimensional image data stored in the line buffers 46a, 46b are alternately supplied to the drivers DR(i) according to effective signals S(i) from the effective signal generating circuits EN(i).

Specifically, the controller 34 supplies an auxiliary scanning signal, which is generated when the drum rotation control circuit 26 controls the drum rotation motor 24, to the effective signal generating circuits EN(i). The auxiliary scanning signal is generated as one pulse each time the drum 14 makes one revolution. The effective signal generating circuits EN(i) count pulses of the supplied auxiliary scanning signal, generate a line number count LC, compare the line number count LC with the integral part $\Delta D(i)$ of the corrective converted line number supplied from the control data memory 42, and make the effective signals S(i) to be supplied to the buffer memories LB(i) low in level, as shown in FIG. 8, while $0 \leq LC \leq \Delta D(i)$. Insofar as the effective signals S(i) are low in level, the one-dimensional image data supplied from the second image memories HM(i) to the buffer memories LB(i) become the ineffective image data 56b, and hence are not outputted to the drivers DR(i). Therefore, no image is recorded on the recording film F during this time.

When $LC > \Delta D(i)$, the effective signal generating circuits EN(i) make the effective signals S(i) high in level and supply the effective signals S(i) to the buffer memories LB(i). Therefore, the one-dimensional image data supplied from the second image memories HM(i) to the buffer memories LB(i) are transferred as the effective image data 56a to the drivers DR(i), which energize the laser diodes LD(i) to record an image on the recording film F.

As described above, the light source units CH(i) start recording divided images A(i) after a delay represented by the integral part $\Delta D(i)$ of the corrective converted line number, and then complete recording the divided images A(i) after desired scanning lines L(i) are recorded for the divided images A(i). The divided images A(i) thus recorded make up an image 54 in which the main scanning line displacement equal to or greater than the pixel interval P/2 has been corrected between the exposure units CH(i).

When the allowable pixel displacement $\Delta\alpha$ is in the range $\Delta\alpha < P/2$, it is necessary to correct the main scanning line displacement in view of the decimal part $\Delta S(i)$ of the corrective converted line number in addition to the integral part $\Delta D(i)$ of the corrective converted line number.

In the present embodiment, while the ineffective image data 56b corresponding to the integral part $\Delta D(i)$ of the corrective converted line number are not being recorded and also while the effective image data 56a corresponding to the line number (L(i)−k) are being recorded, the exposure head 12 is moved at an auxiliary scanning speed V. Then, while the effective image data 56a corresponding to the line number k are being recorded, the exposure head 12 is moved at an auxiliary scanning speed V/n (n>P/Δα, n>2). With the drum 14 being rotated at a constant speed, i.e., a constant main scanning speed, the pixel pitch between pixels 58 recorded at the auxiliary scanning speed V/n can be adjusted with an accuracy of P/n.

Specifically, the controller 34 supplies an auxiliary scanning signal to the second image memories HM(i) for every (n+q) pulses where q represents a corrective value to record an image at the timing of the auxiliary scanning signal, thus forming a main scanning line for pixel pitch P·(n+q)/n.

Figure 10:
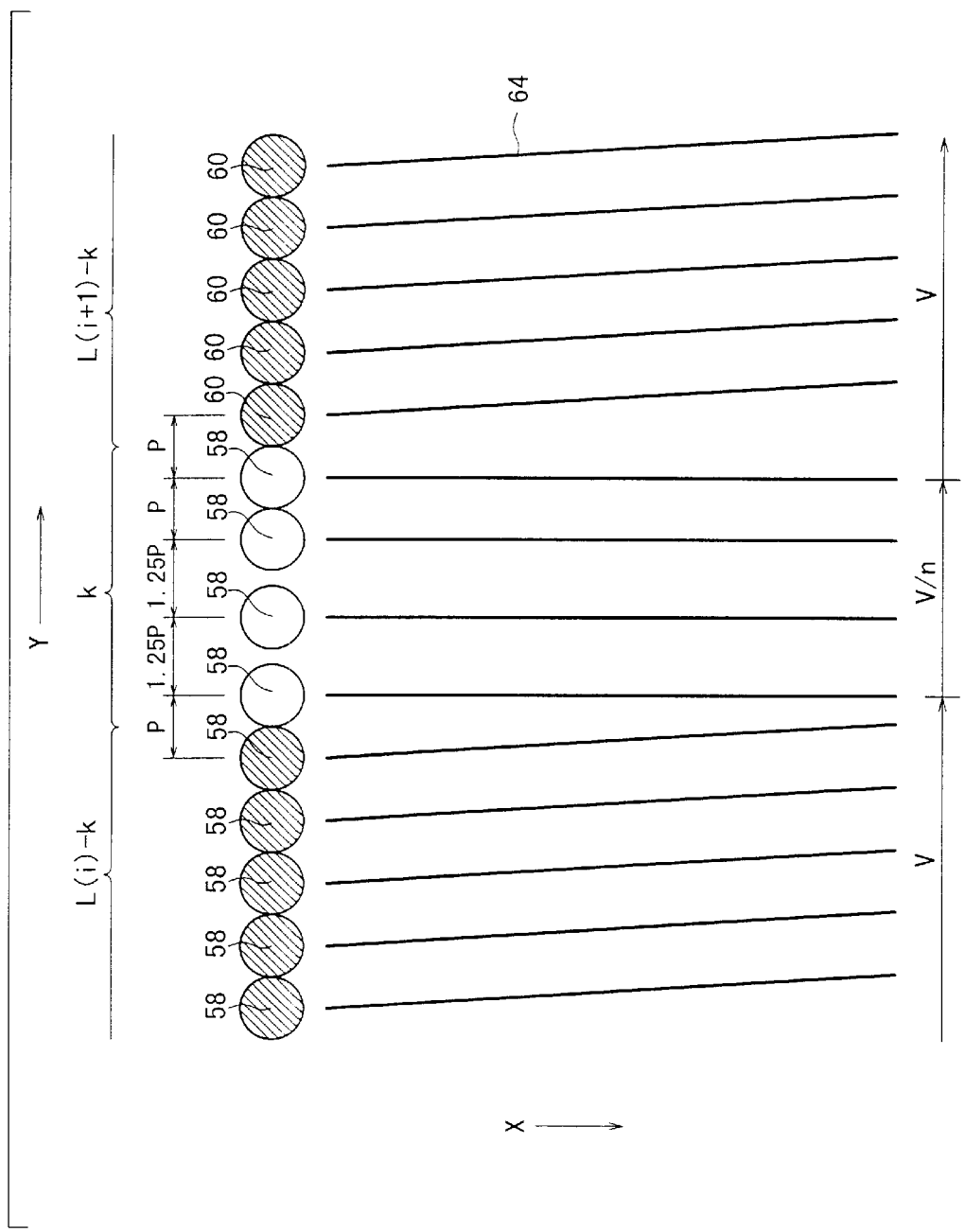
FIG. 10 is a diagram illustrative of a process of correcting the intervals between main scanning lines in the exposure recording method.

FIG. 10 schematically shows the manner in which the intervals between main scanning lines 64 formed by pixels 58, 60 at the junction between the divided images A(i), A(i+1) at k=4, n=4 when ΔS(i)=0.5. The pixels 58, 60 represented by hatched circles are recorded at an auxiliary scanning speed V, and the pixels 58, 60 represented by blank circles are recorded at an auxiliary scanning speed V/4.

When the auxiliary scanning speed is reduced from V to V/4, the controller 34 sets the corrective value q to q=0. When the drum 14 makes four revolutions, the controller 34 supplies an auxiliary scanning signal of a fourth pulse to the second image memories HM(i) and the effective signal generating circuits EN(i), thereby recording pixels 58 that make up the (L(i)−3)th main scanning line 64. Then, the controller 34 sets the corrective value q to q=1, and when the drum 14 makes five revolutions, the controller 34 supplies an auxiliary scanning signal of a fifth pulse to the second image memories HM(i) and the effective signal generating circuits EN(i), thereby recording pixels 58 that make up the (L(i)−2)th main scanning line 64. Similarly, when the drum 14 makes five revolutions, the controller 34 records pixels 58 that make up the (L(i)−1)th main scanning line 64. Finally, the controller 34 sets the corrective value q to q=0, and when the drum 14 makes four revolutions, the controller 34 records pixels 58 that make up the L(i)th main scanning line 64. In this manner, it is possible to form main scanning lines 64 where the maximum pixel displacement is 0.25 and the pixel pitches are adjusted to P, 1.25P, 1.25P, and P.

If an image is recorded only by correcting the pixel pitch P as described above, then the main scanning lines 64 recorded at the auxiliary scanning speed V and the main scanning lines 64 recorded at the auxiliary scanning speed V/n are inclined at different angles, tending to adversely affecting the image at the junctions.

A process of reducing the visibility of the difference between the above different inclinations of the main scanning lines 64 will be described below.

Each of the main scanning lines 64 represented by the line number k and recorded at the auxiliary scanning speed V/n is divided by h (n≧h>1) in the main scanning direction X into divided main scanning lines each made up of L/h pixels (L: the number of pixels making up the main scanning line 64), and the divided main scanning lines are recorded at respective main scanning times that are shifted in the auxiliary scanning direction. In this manner, the inclination of the main scanning lines recorded at the auxiliary scanning speed V/n is brought closely to the inclination of the main scanning lines recorded at the auxiliary scanning speed V.

Specifically, the controller 34 supplies an auxiliary scanning signal to the second image memories HM(i) for every (n+q) pulses to the second image memories HM(i) and the effective signal generating circuits EN(i), and the effective signal generating circuits EN(i) supply the buffer memories LB(i) with divided effective signals U(c) (c=1 through h) to transfer image data per L/h pixels upon one revolution of the drum 14 to the drivers DR(i), based on the auxiliary scanning signal supplied for every (n+q) pulses. It is thus possible to form a main scanning line for every pixel pitch P·(n+q)/n, and divide each of main scanning lines in the auxiliary scanning direction and record divided main scanning lines to reduce the difference between the inclinations of the main scanning lines.

Figure 11:
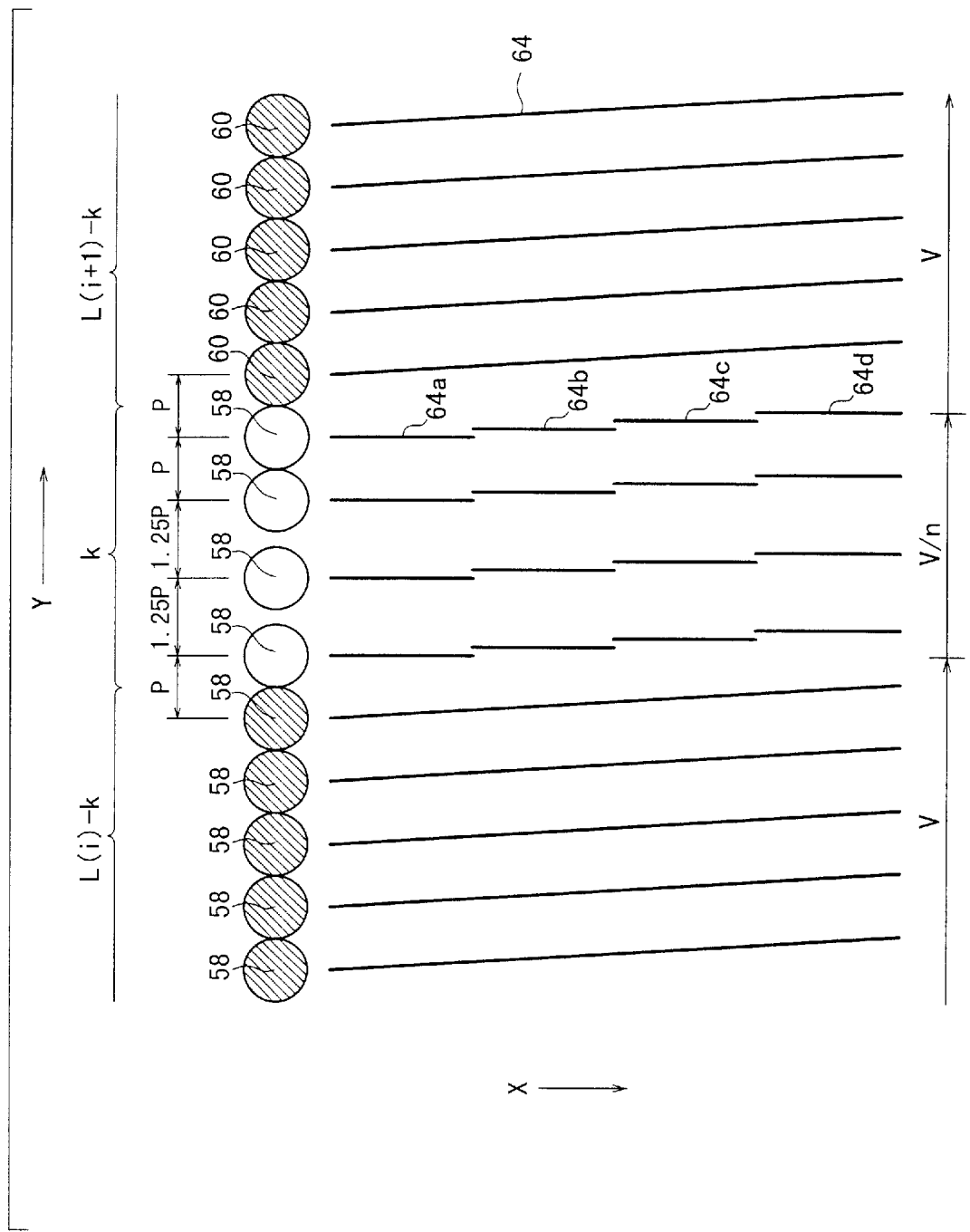
FIG. 11 is a diagram illustrative of a process of correcting the intervals between and tilts of main scanning lines in the exposure recording method.
Figure 12:
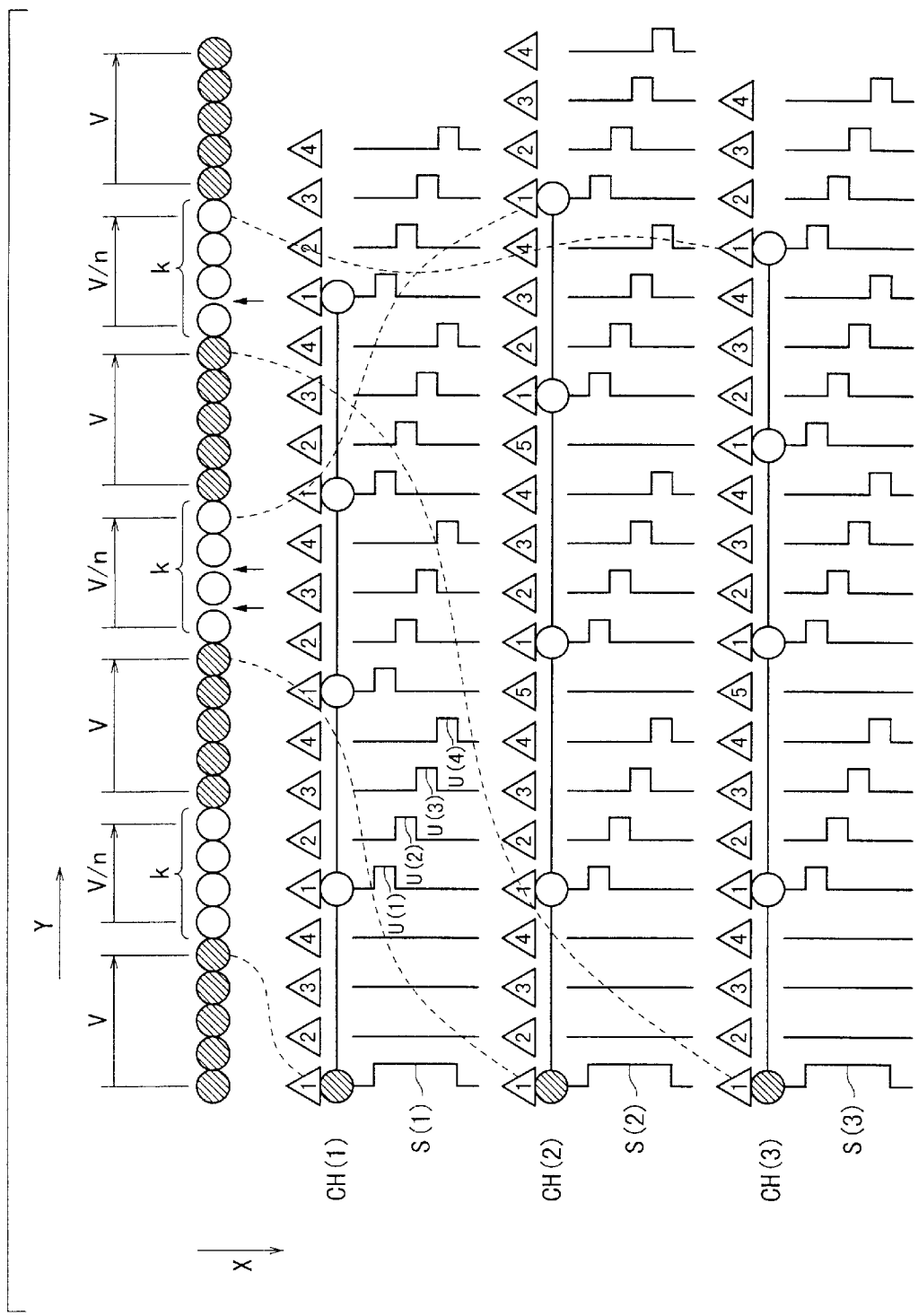
FIG. 12 is a diagram showing divided effective signals generated to perform the correcting process illustrated in FIG. 11.

FIGS. 11 and 12 schematically show the manner in which the number h by which to divide each main scanning line 64 is set to 4, and an image is recorded by 4 divided main scanning lines 64a through 64d.

When the auxiliary scanning speed is reduced from V to V/4, the controller 34 sets the corrective value q to q=0. When the drum 14 makes four revolutions, the controller 34 supplies an auxiliary scanning signal of a fourth pulse to the second image memories HM(i) and the effective signal generating circuits EN(i). Based on the supplied auxiliary scanning signal, the second image memories HM(i) transfer image data that make up the (L(i)−3)th main scanning line 64 to the buffer memories LB(i).

Based on the supplied auxiliary scanning signal, the effective signal generating circuits EN(i) supply a high-level divided effective signal U(1) that makes effective image data of L/4 pixels stored in the buffer memories LB(i), to the buffer memories LB(i). According to the divided effective signal U(1), the buffer memories LB(i) supply the image data of L/4 pixels to the drivers DR(i). The drivers DR(i) record a divided main scanning line 64a on the recording film F based on the supplied image data. After the divided main scanning lines 64a are formed on the recording film F, when the drum 14 makes one revolution, the effective signal generating circuits EN(i) supply a high-level divided effective signal U(2) that makes effective next image data of L/4 pixels, to the buffer memories LB(i). According to the divided effective signal U(2), the buffer memories LB(i) supply the image data of L/4 pixels to the drivers DR(i), which record a divided main scanning line 64b on the recording film F based on the supplied image data. Similarly, divided main scanning lines 64c, 64d are recorded on the recording film F.

The divided main scanning lines 64a through 64d are thus recorded on the recording film F. Likewise, (L(i)−2), (L(i)−1), L(i) main scanning lines 64 are recorded as divided main scanning lines on the recording film F. In this manner, it is possible to form main scanning lines 64 where the maximum pixel displacement is 0.25 and the pixel pitches are adjusted to P, 1.25P, 1.25P, and P, and whose inclination differences are not visually perceived.

In the above description, the pixel interval is corrected provided the decimal part ΔS(i) of the corrective converted line number is of a positive value. If 0.5<ΔS(i)<1, then an image can be recorded at a higher speed by replacing the decimal part ΔS(i) of the corrective converted line number with a negative value and performing the correcting process based on the negative decimal part ΔS(i).

Specifically, the corrective converted line number (ΔD(i)+ΔS(i)) according to the equation (3) can be rewritten as:

$$(\Delta D(i)+\Delta S(i))=(\Delta D(i)+1)+(\Delta S(i)-1) \qquad (5)$$

As can be seen from FIG. 4, after the divided images A(i) corresponding to the line number (L(i)−k) are shifted and recorded in the auxiliary scanning direction Y by the integral part (ΔD(i)+1) of the corrective converted line number at the auxiliary scanning speed V, the divided images A(i) corresponding to the line number k are shifted and recorded in the direction opposite to the auxiliary scanning direction Y by the decimal part (ΔS(i)11) (negative value) of the corrective converted line number at the auxiliary scanning speed V/n. With the images thus recorded, the line number K that needs to be recorded at the lower auxiliary scanning speed V/n can be reduced, thus shortening the period of time required to record the entire image. One corrective line that is to be added to a divided image A(i) may be added to a previous divided image A(i−1) or a next divided image A(i+1).

Figure 9:
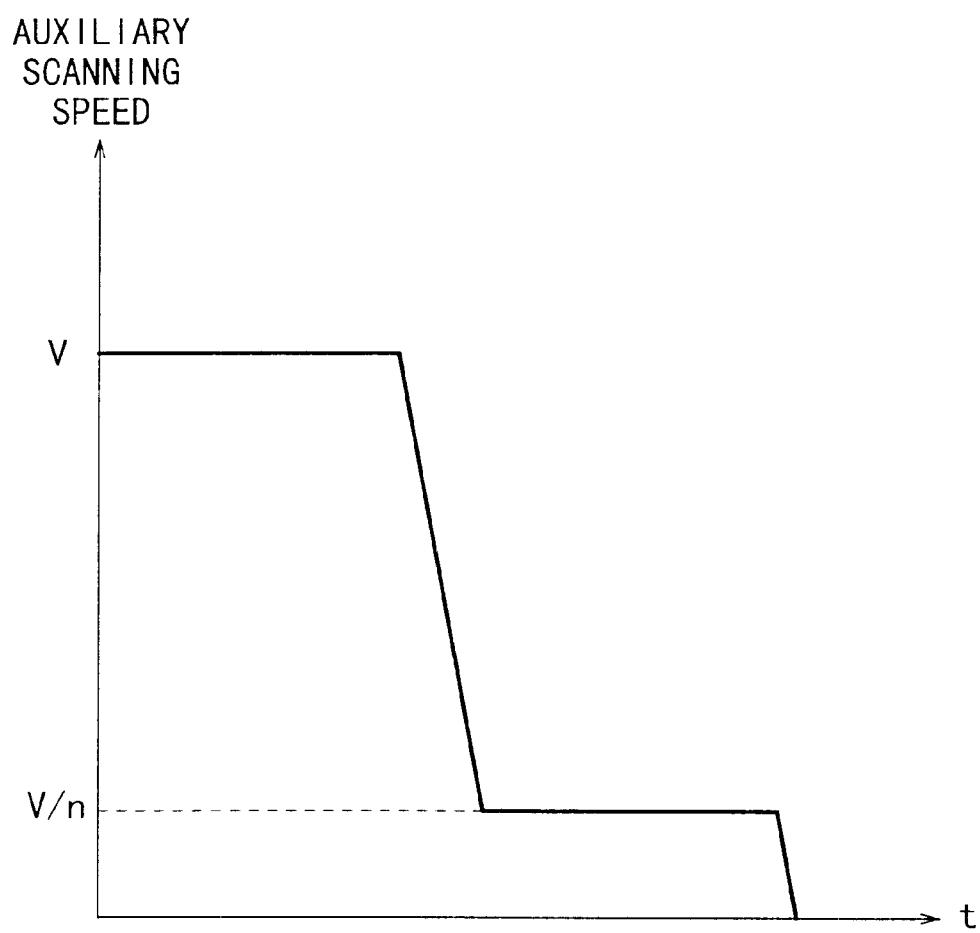
FIG. 9 is a diagram showing auxiliary scanning speeds in the exposure recording method.

In the above embodiment, as shown in FIG. 9, after the effective image data 56a corresponding to the line number (L(i)−k) are recorded at the auxiliary scanning speed V, the auxiliary scanning speed V is reduced to the auxiliary scanning speed V/n, and then the effective image data 56a corresponding to the line number k are recorded at the auxiliary scanning speed V/n. However, after the auxiliary scanning speed V of the exposure head 12 is temporarily reduced to 0 to stop the exposure head 12, the exposure head 12 may be controlled to move at the auxiliary scanning speed V/n.

When the auxiliary scanning speed is controlled as described above, since the exposure head 12 has an inertial force, the exposure head 12 is liable to move past a desired recording position, resulting in an inaccurate pixel pitch, unless the auxiliary scanning speed V is changed to the auxiliary scanning speed V/n or 0 in a short period of time.

Figure 13:
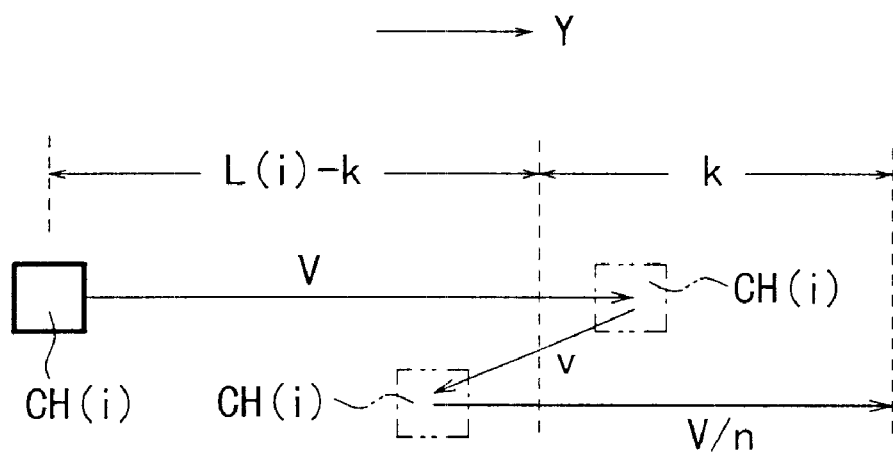
FIG. 13 is a diagram illustrative of an auxiliary scanning speed control process in an exposure recording method according to another embodiment of the present invention.

Such a shortcoming can be avoided by moving the light source units CH(1) through CH(m) of the exposure head 12 as shown in FIG. 13. For example, when the light source units CH(i) are stopped after they are moved at the auxiliary scanning speed V in the direction indicated by the arrow Y to record the divided images A(i) corresponding to the line number (L(i)−k) on the recording film F, the light source units CH(i) overrun to a position indicated by the dotted lines due to an inertial force. Then, the light source units CH(i) are moved back at the auxiliary scanning speed V into the recording region corresponding to the line number (L(i)−k), and then moved at the auxiliary scanning speed V/n in the direction indicated by the arrow Y. By adjusting the distance that the light source units CH(i) are moved back, it is possible to set the speed at which the remaining line number k of the divided images A(i) starts being recorded, to the desired auxiliary scanning speed V/n. As a result, the divided images A(i) can be recorded highly accurately irrespective of the inertial force of the light source units CH(i).

Figure 8:
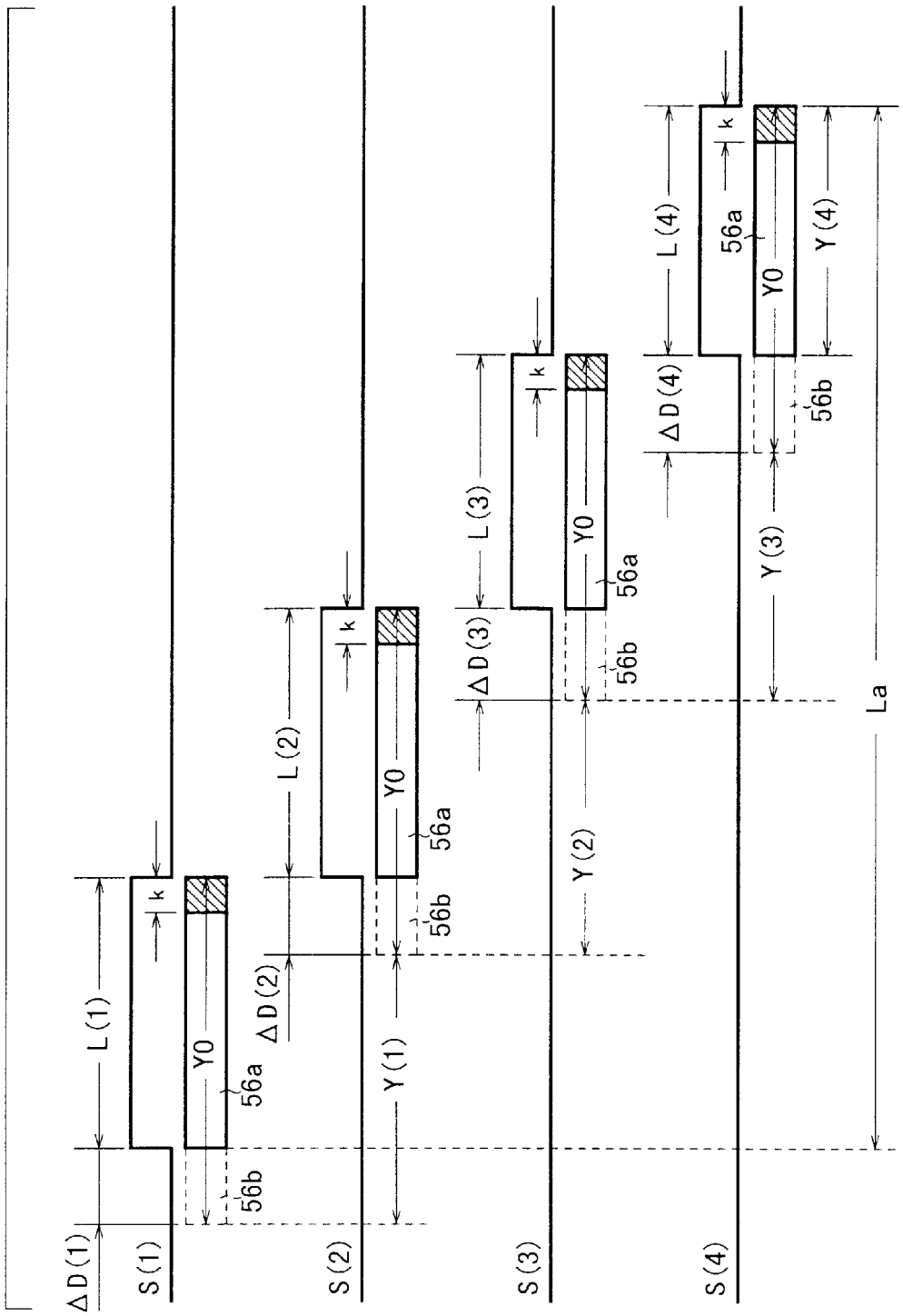
FIG. 8 is a diagram showing the relationship between image data and effective signals for recording the image data in the exposure recording method.
Figure 14:
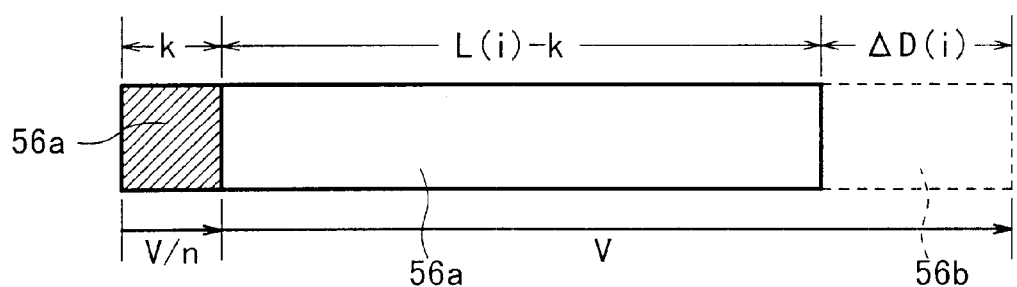
FIG. 14 is a diagram illustrative of an exposure recording method according to still another embodiment of the present invention.

In the above embodiment, in order to correct a displacement of the positions recorded by the laser beams b(i), the integral part ΔD(i) of the corrective converted line number is first set to correct the integral part of the number of main scanning lines, as shown in FIG. 8, then the effective image data 56a corresponding to the line number L(i) are recorded, and at the end of the recorded effective image data 56a, the auxiliary scanning speed is set to V/n to correct the decimal part of the number of main scanning lines. The decimal part of the number of main scanning lines may be corrected at each of the junctions between the laser beams b(i) to correct the displacement of the positions recorded by the laser beams b(i). Therefore, as shown in FIG. 14, for example, the auxiliary scanning speed may first be set to V/n to correct the decimal part of the number of main scanning lines, then the effective image data 56a corresponding to the line number (L(i)−k) may be recorded, and thereafter integral part ΔD(i) of the corrective converted line number may be corrected.

Although certain preferred embodiments of the present invention have been shown and described in detail, it should be understood that various changes and modifications may be made therein without departing from the scope of the appended claims.

What is claimed is:

1. A method of recording a two-dimensional image on a photosensitive medium by exposure to light beams which are emitted from a plurality of light sources arrayed in an auxiliary scanning direction and applied to scan the photosensitive medium in a main scanning direction and the auxiliary scanning direction, comprising the steps of:

reducing an auxiliary scanning speed of each of the light beams emitted from the light sources in a predetermined range in a recording start area or a recording end area among recording areas produced by the light sources;

performing one of increasing and reducing intervals between main scanning lines formed by the respective light beams toward the recording areas of adjacent ones of the light beams in order to correct a displacement of positions recorded by the respective light beams with respect to the auxiliary scanning direction.

2. A method according to claim 1, wherein when said auxiliary scanning speed is to be changed between said recording start area of said recording end area and the recording areas adjacent thereto, after said light beams reach junctions between said recording start area or said recording end area and the recording areas adjacent thereto, said light sources are returned a predetermined distance in said auxiliary scanning direction and then said auxiliary scanning speed is changed.

3. A method according to claim 1, wherein the number of the main scanning lines recorded by the respective light beams is adjusted to correct an integral part of said displacement, and the intervals between said main scanning lines are adjusted to correct a decimal part of said displacement.

4. A method according to claim 3, wherein the number L(i) of the main scanning lines recorded by the respective light beans is established as:

$$L(i)=Y0-(\Delta D(i)+\Delta S(i))$$

where ΔD(i) represents the integral part of said displacement, ΔS(i) represents the decimal part of said displacement, and Y0 represents the distance that each of the light beams is moved in the auxiliary scanning direction, as converted into the number of main scanning lines.

5. A method according to claim 4, wherein if the decimal part Δ(i) of said displacement is in the range of 0<ΔS(i)≦0.5, then the intervals between said main scanning lines are controlled so as to increase toward said recording areas recorded by adjacent ones of said light beams, and if the decimal part ΔS(i) of said displacement is in the range of 0.5<ΔS(i)<1, then the intervals between said main scanning lines are controlled so as to decrease toward said recording areas recorded by adjacent ones of said light beams.

6. A method according to claim 1, wherein the auxiliary scanning speed V in said recording areas adjacent to said recording start area or said recording end area is reduced to an auxiliary scanning speed V/n in the predetermined range in said recording start area or said recording end area;

wherein n>P/Δα,n>2, P=the intervals between said main scanning lines at said auxiliary scanning speed V, and Δα=an allowable pixel displacement in the positions recorded by the light beams.

7. A method according to claim 6, wherein said main scanning lines at said auxiliary scanning speed V/n are set to the intervals P·(n+q)/n where q represents a corrective value.

8. A method according to claim 6, wherein each of said main scanning lines is divided by a predetermined number h in the main scanning direction into divided main scanning lines, and the divided main scanning lines are formed separately in the auxiliary scanning direction, wherein $n \geq h > 1$.

9. A method according to claim 1, wherein increasing the intervals between main scanning lines formed by the respective light beams toward the recording areas of the adjacent light beams in order to correct the displacement of positions recorded by the respective light beams with respect to the auxiliary scanning direction is performed when adjacent pixels formed by the adjacent light beams overlap each other by at least half of a pixel pitch; and wherein reducing the intervals between main scanning lines formed by the respective light beams toward the recording areas of the adjacent light beams in order to correct the displacement of positions recorded by the respective light beams with respect to the auxiliary scanning direction is performed when the adjacent pixels formed by the adjacent light beams are spaced apart from each other by at least half of the pixel pitch.

* * * * *